United States Patent [19]

Houlihan

[11] 3,852,303
[45] Dec. 3, 1974

[54] PROCESS FOR IMIDAZO[2,1-a]ISOINDOLES AND INTERMEDIATES

[75] Inventor: William J. Houlihan, Mountain Lakes, N.J.

[73] Assignee: Sandoz-Wander, Inc.

[22] Filed: Nov. 30, 1972

[21] Appl. No.: 310,821

Related U.S. Application Data

[62] Division of Ser. No. 812,948, March 5, 1969, abandoned.

[52] U.S. Cl.............. 260/309.6, 260/307.7, 260/999
[51] Int. Cl............................................. C07d 49/34
[58] Field of Search................... 260/309.6, 309.7

[56] References Cited
UNITED STATES PATENTS
3,657,269  4/1972  Houlihan ........................ 260/309.6
3,717,658  2/1973  Metlesicj et al. ................ 260/309.6

OTHER PUBLICATIONS

Alley et al., J. Amer. Chem. Soc., Vol. 80, Pages 6271–6274, (1958), QDI.A5.

Godovikova et al., Chem. Abst., Vol. 70, No. 77908e, (1969), QDI.A51.

Primary Examiner—Natalie Trousof
Attorney, Agent, or Firm—Gerald D. Sharkin; Robert S. Honor

[57] ABSTRACT

Imidazoisoindoles useful as anorexics are prepared by lithiating 2-phenylimidazoline, treating the resulting dilithium product so as to obtain a benzhydrol or benzyl alcohol and heating and oxidizing the resulting product to obtain the desired imidazoisoindoles.

3 Claims, No Drawings

PROCESS FOR IMIDAZO[2,1-A]ISOINDOLES AND INTERMEDIATES

This is a division of application Ser. No. 812,948, filed Mar. 5, 1969, now abandoned.

This invention relates to a process for preparing imidazoisoindoles. More specifically, it relates to a multi-step process which provides benzhydrols or benzyl alcohols which are then converted to the imidazoisoindoles. The invention also relates to said benzhydrols or benzyl alcohols and acid addition salts thereof.

The imidazoisoindoles which may be prepared according to this invention are of the formula

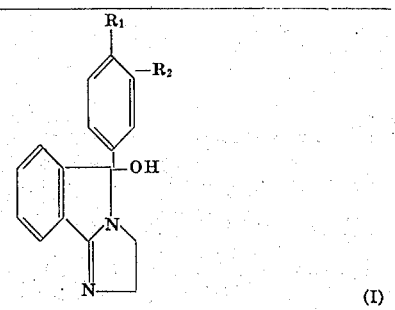

where $R_1$ and $R_2$ represent hydrogen or halo having an atomic weight of about 19–36. These compounds (I) can also exist as the corresponding tautomers of formula (Ia)

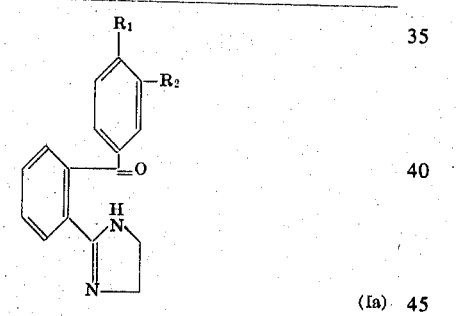

where $R_1$ and $R_2$ are as defined above.

For the sake of simplicity, however, only the compounds of formula (I) will be referred to although it should be understood the compounds of structure (Ia) are also an aspect of the present invention.

The imidazoisoindoles of formula (I) may be prepared from the corresponding benzhydrol or benzyl alcohol of formula (II).

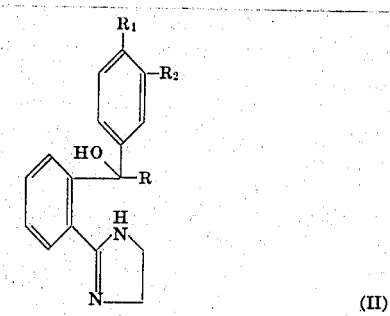

or an acid addition salt thereof, where $R_1$ and $R_2$ are as defined above and R represents hydrogen or a phenyl radical.

Compounds (I) are prepared from the compounds of formula (II) by treating the latter at a temperature of 30°–100°C, preferably 50°–80°C, with a catalytic amount of acid, preferably an organic acid such as p-toluene sulfonic acid, benzenesulfonic acid, acetic acid and the like, in inert hydrocarbon solvent such as an aromatic hydrocarbon or paraffin, e.g., benzene, toluene, n-hexane and the like. The resulting reaction mixture is then exposed in an inert ether solvent, desirably at room temperature, to air or oxygen for 2 to 10 days to obtain the compound (I). However, it is generally more desirable to bubble air oxygen at room temperature into a solution of the product obtained by heating the compound (II). The solvent used is preferably a lower alkanol, e.g., methanol or ethanol. In this manner appreciable yields of compound (I) are obtained within about 4 hours. The resulting compound of formula (I) may then be recovered using conventional techniques.

The compounds of formula (II) are obtained by a multistep process from 2-phenylimidazoline by use of the process represented below.

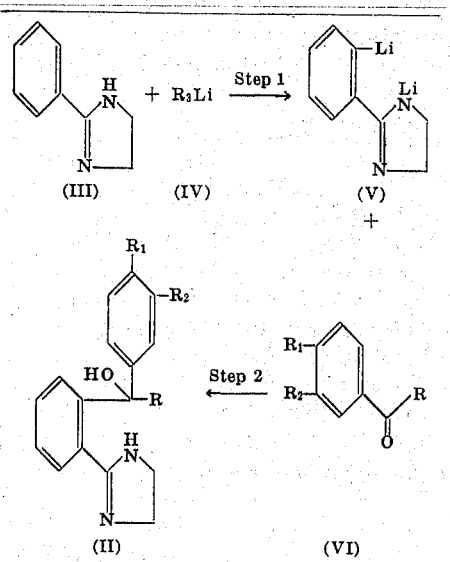

where R, $R_1$ and $R_2$ are as above defined, and $R_3$ is straight chain lower alkyl of 1–4 carbon atoms, e.g., methyl, or n-butyl.

In the first step of this process 2-phenylimidazoline is treated with an alkyl lithium compound of the formula (IV) in inert atmosphere, e.g., nitrogen, and inert solvent such as a hydrocarbon, for example hexane or heptane, or an ether, e.g., diethyl ether, or tetrahydrofuran. The reaction may be performed at temperatures of about 30°–100°C. preferably the reflux temperature of the system, for about 0.5–2.5 hours. The resulting compound is the N,o-dilithio derivative of 2-phenylimidazoline (V). Said dilithio compound (V) is then treated with a compound of formula (VI) under the same conditions of temperature, atmosphere and solvent as the immediately preceding reaction (step 1)

to provide the compound (II). This product (II) is recovered using conventional techniques.

Neither temperatures nor solvents in any of the above described reactions are critical.

The starting compounds (II), (IV) and (VI) are known and may be prepared using procedures described in the art.

The compounds of formula (I) are useful because they possess pharmacological activity in animals. In particular, they possess appetite depressant activity as indicated by their activity in rat given 12.5 mg/kg of active agent and tested by use of the free-feeding method described by Randall, et al. (J.P.E.T., 129, 163, 1960) whereby 16 groups of six male Wistar rats are deprived of food for 18 hours but receive water ad libitum. Consumption of ground food is then measured over a four hour period following oral administration of the agent tested. Accordingly, these compounds may be used as anorexigenic agents. The compounds of this invention also possess central nervous system stimulant activity and can be used as psychic energizers as indicated by their activity in mouse given 25 mg/kg of active compounds and tested by use of a 30 word adjective check sheet method basically as described by Irwin, S. (Gordon Research Conference, Medicinal Chemistry, 1959), and Chen (Symposium on Sedative and Hypotic Drugs, Williams and Wilkins, 1954).

The compounds of formula (II) possess pharmacological activity in animals also. In particular they possess appetite depressant activity as indicated by their activity in rats given 50 mg/kg of active agent and tested by use of the free-feeding method described by Randall, et al (J.P.E.T., 129: 163, 1960) whereby 12 groups of 10 male Wistar are deprived of food for 20 hours but receive water ad libitum. Consumption of ground food is then measured over 1 and 4 hour periods following oral administration of the compound tested.

For such uses, the compounds (I) or (II) may be combined with a pharmaceutically acceptable carrier, and such other adjuvants as may be necessary, and administered orally in such forms as tablets, capsules, elixirs, suspensions and the like or parenterally in the form of an injectable solution or suspension. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrobromide, hydrochloride, sulfate, phosphate and the like and the organic acid salts such as the succinate, benzoate, acetate, maleate, p-toluenesulfonate, benzenesulfonate and the like.

For the above-mentioned uses, the dosage administered will, of course, vary depending upon the mode of administration and treatment desired. However, in general, satisfactory results are obtained for each of the above-mentioned uses when the compounds (I) are administered at a daily dosage of from about 0.02 milligrams to about 25 milligrams per kilogram of animal body weight, preferably given in divided doses, 2 to 4 times a day, or in sustained release form. For most large mammals the daily dosage of compounds (I) is generally in the range of about 1 to 25 mgs, and dosage forms suitable for internal administration comprise from about 0.25 mgs to about 12.5 mgs of the compounds admixed with a solid or liquid pharmaceutical carrier or diluent.

Respecting the above-mentioned use of compounds (II), generally satisfactory results are obtained when the compounds (II) are administered at a daily dosage of from about 1 to 100 mg/kg of animal body weight, preferably given in divided doses 2 to 4 times a day, or in sustained release form. For most large mammals the daily dosage is generally in the range of from about 75 to 750 mgs, and dosage forms suitable for internal administration comprise from about 20 to about 375 mgs of the compound admixed with a solid or liquid pharmaceutical carrier or diluent.

A representative formulation is a tablet prepared by standard tabletting techniques which contains the following ingredients.

| Ingredient | Quantity |
| --- | --- |
| 5-(p-chlorophenyl)-5-hydroxy-2,3-dihydro-5H-imidazo[2,1-a]isoindole | 1 |
| polyvinylpyrrolidone | 3.5 |
| lactose | 40 |
| calcium sulfate | 16.5 |
| corn starch | 8 |
| talc | 5 |
| magnesium stearate | 1.0 |
| | 75 mg |

The following examples are provided for the purpose of illustration and not by way of limitation. They are not intended so as to limit the scope of the invention as defined in the appended claims.

EXAMPLE 1

α-[o-(2-imidazolin-2-yl)phenyl]benzhydrol

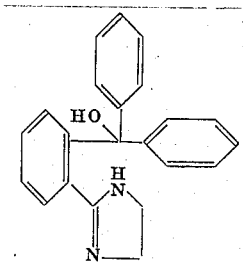

To a flask equipped with a stirrer, condenser and dropping funnel, and maintained under a nitrogen atmosphere, is charged 7.3 g (0.05 moles) of 2-phenylimidazoline and 80 ml of dry tetrahydrofuran. Over a 10 minute period and with stirring, 80 ml of 1.6 M n-butyllithium in hexane (0.125 moles of n-butyllithium) is added. The suspension is stirred and refluxed for about 1 hour to provide the N,o-dilithium derivative of 2-phenyl-2-imidazoline. A solution of 14.6 g (.08 moles) of benzophenone in 80 mls of dry tetrahydrofuran is then added to the suspension over a period of 0.5 hours. The mixture is refluxed for 0.5 hours, cooled in an ice bath, and treated with 100 ml of water. The resultant solid is filtered off and crystallized from ether-isopropanol (1:1) to give α-[o-(2-imidazolin-2-yl)phenyl]benzhydrol; m.p. 181°–184°C.

EXAMPLE 2

4-Chloro-α-[o-(2-imidazolin-2-yl)phenyl]benzhydrol

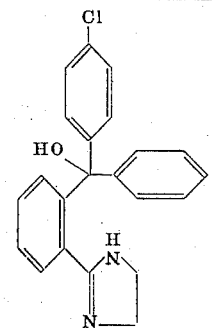

To a flask equipped with a stirrer, condenser and dropping funnel, and maintained under a nitrogen atmosphere, is charged 7.3 g (0.05 moles) of 2-phenylimidazoline and 80 ml of dry tetrahydrofuran. Over a 10 minute period and with stirring, 80 ml of 1.6M n-butyllithium in hexane (0.125 moles of n-butyllithium) is added. The suspension is stirred and refluxed for about 1 hour to provide the N,o-dilithium derivative of 2-phenyl-2-imidazoline. A solution of 17.3 g (.08 moles) of p-chlorobenzophenone in 80 mls of dry tetrahydrofuran is then added to the suspension over a period of 0.5 hours. The mixture is refluxed for 0.5 hours, cooled in an ice bath, and treated with 100 ml of water. The resultant solid is filtered off and crystallized from ether-isopropanol (1:1) to give 4-chloro-α-[o-(2-imidazolin-2-yl)phenyl]benzhydrol; m.p. 134°–136°C.

EXAMPLE 3

4-Chloro-α-[o-(2-imidazolin-2-yl)phenyl]benzyl alcohol

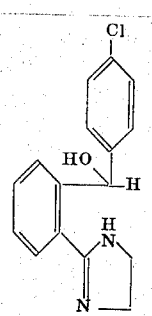

To a flask equipped with a stirrer, condenser and dropping funnel, and maintained under a nitrogen atmosphere, is charged 7.3 g (0.05 moles) of 2-phenylimidazoline and 80 ml of dry tetrahydrofuran. Over a 10 minute period and with stirring, 80 ml of 1.6 M n-butyllithium in hexane (0.125 moles of n-butyllithium) is added. The suspension is stirred and refluxed for about 1 hour to provide the N,o-dilithium derivative of 2-phenyl-2-imidazoline. A solution of 11.2 g (0.08 moles) of p-chlorobenzaldehyde in 80 ml of dry tetrahydrofuran is then added to the suspension over a period of 0.5 hours. The mixture is refluxed for 0.5 hours, cooled in an ice bath, and treated with 100 ml of water. The tetrahydrofuran layer is separated, dried with magnesium sulfate, filtered, and concentrated in vacuo. The residue is chromatographed on silica gel (250 g) and eluted with chloroformmethanol (9:1) to give 4-chloro-α-[o-(2-imidazolin-2-yl)phenyl]benzyl alcohol.

EXAMPLE 4

5-(p-Chlorophenyl)-5-hydroxy-2,3-dihydro-5H-imidazo[2,1-a]isoindole

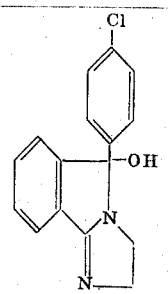

4-Chloro-α-[o-(2-imidazolin-2-yl)phenyl]benzyl alcohol obtained as shown in Example 3 is added to a flask equipped with a Dean-Stark tube containing 150 ml of toluene and 0.1 g of p-toluenesulfonic acid. The mixture is stirred and refluxed until water fails to separate in the side-arm. The mixture is then allowed to stand in the presence of air for 96 hours and the resulting solid is filtered off to give 5-(p-chlorophenyl)-5-hydroxy-2,3-dihydro-5H-imidazo[2,1-a]isoindole; m.p. 198°–200°C.

When the above process is carried out and α-[o-(2-imidazolin-2-yl)phenyl]benzhydrol is used in place of 4-chloro-α-[o-(2-imidazolin-2-yl)phenyl]benzyl alcohol there is obtained 5-hydroxy-5-phenyl-2,3-dihydro-5H-imidazo[2,1-a]isoindole; m.p. 197°–199°C.

What is claimed is:

1. The N,o-dilithium derivative of 2-phenyl-2-imidazoline.

2. The compound of claim 1 in inert hydrocarbon or ether solvent.

3. A process for preparing a compound of the formula

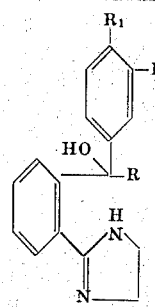

which comprises treating 2-phenylimidazoline with an alkyl lithium compound of the formula $R_3$ Li in inert atmosphere and inert solvent, to obtain the N,o-dilithium derivative of 2-phenylimidazoline and treating said derivative with a compound of the formula
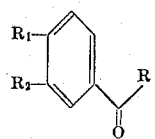
in inert atmosphere and inert solvent
where
R represents hydrogen or a phenyl radical,
$R_1$ and $R_2$ represent hydrogen or halo having an atomic weight of about 19–36, and
$R_3$ is a straight chain alkyl of 1 to 4 carbon atoms.
* * * * *